United States Patent
Aaron et al.

(10) Patent No.: US 7,594,605 B2
(45) Date of Patent: Sep. 29, 2009

(54) CREDIT CARD TRANSACTION SERVERS, METHODS AND COMPUTER PROGRAM PRODUCTS EMPLOYING WIRELESS TERMINAL LOCATION AND REGISTERED PURCHASING LOCATIONS

(75) Inventors: Jeffrey A. Aaron, Atlanta, GA (US); John P. Ruckart, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 11/651,891

(22) Filed: Jan. 10, 2007

(65) Prior Publication Data

US 2008/0164308 A1 Jul. 10, 2008

(51) Int. Cl.
*G06K 5/00* (2006.01)
(52) U.S. Cl. ............. 235/380; 235/379; 235/382; 705/1; 705/44
(58) Field of Classification Search ........... 235/380; 705/44
See application file for complete search history.

(56) References Cited

U.S. PATENT DOCUMENTS

| 6,612,488 | B2 | 9/2003 | Suzuki |
| 6,636,833 | B1 | 10/2003 | Flitcroft et al. |
| 6,913,194 | B2* | 7/2005 | Suzuki ............... 235/380 |
| 6,947,978 | B2 | 9/2005 | Huffman |
| 7,104,444 | B2 | 9/2006 | Suzuki |
| 2004/0185830 | A1* | 9/2004 | Joao et al. ............ 455/410 |
| 2005/0033653 | A1* | 2/2005 | Eisenberg et al. ........ 705/26 |
| 2005/0165684 | A1* | 7/2005 | Jensen et al. ........... 705/44 |

* cited by examiner

*Primary Examiner*—Lisa Caputo
*Assistant Examiner*—Ali Sharifzada
(74) *Attorney, Agent, or Firm*—Myers Bigel Sibley & Sajovec

(57) ABSTRACT

A credit card transaction authorization method includes receiving information concerning a prospective remote credit card transaction with a credit card, obtaining location information from a wireless network provider for a wireless terminal that is associated with a cardholder of the credit card for the prospective credit card transaction, and correlating a location of the wireless terminal with a registered purchasing location associated with the user. Authorization information for the prospective credit card transaction may be generated in response to a result of the correlation of the location of the wireless terminal and the registered purchasing location. Credit card transaction servers and computer program products are also provided.

18 Claims, 7 Drawing Sheets

CREDIT CARD TRANSACTION SERVERS, METHODS AND COMPUTER PROGRAM PRODUCTS EMPLOYING WIRELESS TERMINAL LOCATION AND REGISTERED PURCHASING LOCATIONS

FIELD OF THE INVENTION

This invention relates to computer servers, methods and computer program products, and, more particularly, to credit card transaction authorization servers, methods and computer program products.

BACKGROUND OF THE INVENTION

Credit cards are widely used for many consumer, commercial and other transactions. As used herein, the term "credit card" includes secured and unsecured credit cards, as well as debit cards and other stored value cards in various form factors, such as wallet-sized, keychain-sized, etc.

Unfortunately, with the proliferation of credit cards, credit card fraud has become all too common. A thief can steal a credit card or a credit card number, and then use it to purchase thousands of dollars of goods and services before the card is denied. Many measures have been provided to reduce the possibility of fraud, including card holder signatures on the credit card, a picture identification on the credit card and/or the requirement for a separate picture identification of a credit card user, security codes printed on the credit card, billing address verification, purchase pattern screening and/or other known techniques. Problems of credit card fraud may be compounded when the credit card number is used to make a remote purchase, such as an internet purchase or a purchase over the telephone.

A credit card authorization system is described in U.S. Pat. Nos. 6,612,488, 6,913,194 and 7,104,444, all to Suzuki, and all entitled *Method and System to Prevent Fraudulent Payment In Credit/Debit Card Transactions, and Terminals Therefor*. As noted in the common Abstract of these three patents, during a transaction authorization process using a transaction terminal disposed in a credit transaction member store and connected with a host computer, user validation or credit administration is carried out by using a portable communication terminal to input to the host computer identity information which has been previously registered in the portable communication terminal and/or location information for the portable communication terminal.

Notwithstanding these and other measures, credit card fraud continues to be a problem. It is, therefore, desirable to provide additional measures that can reduce or prevent credit card fraud. Moreover, the additional security that is provided should be balanced with the convenience to the legitimate cardholder.

SUMMARY

A credit card transaction server according to some embodiments of the invention includes a credit card transaction interface that is configured to receive information about a credit card transaction that is associated with a credit card, a wireless network interface that is configured to obtain location information for a plurality of wireless terminals that are associated with a wireless network provider, and a credit card transaction authorization processor. The credit card transaction authorization processor is configured to receive information from the credit card transaction interface concerning a prospective remote credit card transaction with the credit card, to instruct the wireless network interface to obtain location information from the wireless network provider for a wireless terminal that is associated with a registered cardholder of the credit card, and to correlate a location of the wireless terminal with a registered purchasing location associated with the registered cardholder. The credit card transaction authorization processor is further configured to generate authorization information for the prospective remote credit card transaction in response to a result of the correlation of the location of the wireless terminal and the registered purchasing location.

The credit card transaction authorization processor may be further configured to obtain additional authentication information concerning the prospective remote credit card transaction if the location of the wireless terminal does not correspond to the registered purchasing location.

The information concerning the prospective remote credit card transaction may include a credit card number associated with the credit card and an IP address associated with a computer terminal from which the prospective remote credit card transaction was initiated, and the credit card transaction authorization processor may be further configured to retrieve a profile associated with the credit card number from a profile database in response to receiving the information concerning the prospective internet credit card transaction, the profile including a wireless terminal identification number associated with the wireless terminal and an identification of the registered purchasing location. The credit card transaction authorization processor may be further configured to obtain a geographic location associated with the IP address if the location of the wireless terminal does not correspond to the registered purchasing location, to compare the geographic location associated with the IP address with the location of the wireless terminal, and to obtain additional authentication information concerning the prospective remote credit card transaction if the location of the wireless terminal does not correspond to the geographic location associated with the IP address.

The information concerning the prospective remote credit card transaction may include a credit card number associated with the credit card and an IP address associated with a computer terminal from which the prospective remote credit card transaction was initiated, and the credit card transaction authorization processor may be further configured to retrieve a profile associated with the credit card number from a profile database in response to receiving the information concerning the prospective internet credit card transaction.

The profile associated with the credit card number may include a wireless terminal identification number associated with the wireless terminal, an identification of the registered purchasing location, and an identification of an internet service provider associated with the registered cardholder and with the registered purchasing location. The credit card transaction authorization processor may be further configured to compare the IP address associated with the computer terminal from which the prospective remote credit card transaction was initiated with a domain associated with the internet service provider associated with the registered purchasing location.

The credit card transaction authorization processor may be further configured to obtain additional authentication information concerning the prospective remote credit card transaction if the IP address does not correspond to the domain associated with the internet service provider associated with the registered purchasing location. In some embodiments, the credit card transaction authorization processor may be further configured to reject the prospective remote credit card transaction if the IP address does not correspond to the domain associated with the internet service provider associated with the registered purchasing location.

The credit card transaction authorization processor may be configured to selectively authorize the prospective remote credit card transaction if the profile indicates that multiple wireless terminals are associated with the registered cardholder of the credit card for the prospective remote credit card transaction and the location of at least one of the multiple wireless terminals corresponds to the registered purchasing location of the registered cardholder, and to selectively obtain authentication of the registered cardholder prior to authorizing the prospective remote credit card transaction if none of the locations of the multiple wireless terminals corresponds to the registered purchasing location of the registered cardholder.

Some embodiments of the invention provide credit card transaction authorization methods. The methods may include receiving information concerning a prospective remote credit card transaction with a credit card, obtaining location information from a wireless network provider for a wireless terminal that is associated with a registered cardholder of the credit card, and correlating a location of the wireless terminal with a registered purchasing location associated with the registered cardholder. Authorization information for the prospective remote credit card transaction may be generated in response to a result of the correlation of the location of the wireless terminal and the registered purchasing location.

The methods may further include obtaining additional authentication information concerning the prospective remote credit card transaction if the location of the wireless terminal does not correspond to the registered purchasing location. Obtaining additional authentication information for the prospective remote credit card transaction may include transmitting an email message to an email address associated with the registered cardholder and receiving a response from the registered cardholder in response to the email message. In some embodiments, obtaining additional authentication information for the prospective remote credit card transaction may include transmitting a request message to the wireless terminal that is associated with the registered cardholder of the credit card for the prospective credit card transaction, and receiving a response message via the wireless network interface in response to the request message. Transmitting the request message may include transmitting the request message via a wireless communication network associated with the wireless terminal and receiving the response message may include receiving the response message via the wireless communication network and/or via the internet. Furthermore, obtaining additional authentication information for the prospective remote credit card transaction may include receiving additional authentication information via the credit card transaction interface.

The information concerning the prospective remote credit card transaction may include a credit card number associated with the credit card and an IP address associated with a computer terminal from which the prospective remote credit card transaction was initiated. The methods may further include retrieving a profile associated with the credit card number from a profile database in response to receiving the information concerning the prospective internet credit card transaction, the profile including a wireless terminal identification number associated with the wireless terminal and an identification of the registered purchasing location. The methods may further include obtaining a geographic location associated with the IP address if the location of the wireless terminal does not correspond to the registered purchasing location, comparing the geographic location associated with the IP address with the location of the wireless terminal, and obtaining additional authentication information concerning the prospective remote credit card transaction if the location of the wireless terminal does not correspond to the geographic location associated with the IP address.

The information concerning the prospective remote credit card transaction may include a credit card number associated with the credit card and an IP address associated with a computer terminal from which the prospective remote credit card transaction was initiated or a telephone number of a telephone used to initiate the prospective remote credit card transaction. The methods further include retrieving a profile associated with the credit card number from a profile database in response to receiving the information concerning the prospective internet credit card transaction. The profile associated with the credit card number may include a wireless terminal identification number associated with the wireless terminal, an identification of the registered purchasing location, and an identification of an internet service provider associated with the registered purchasing location and/or a telephone number associated with the registered purchasing location. The methods may further include comparing the IP address associated with the computer terminal from which the prospective remote credit card transaction was initiated with a domain associated with the internet service provider associated with the registered purchasing location or comparing the telephone number of the telephone used to initiate the prospective remote credit card transaction with the telephone number associated with the registered purchasing location.

The methods may further include obtaining additional authentication information concerning the prospective remote credit card transaction if the IP address does not correspond to the internet service provider associated with the registered purchasing location or if the telephone number of the telephone used to initiate the prospective remote credit card transaction does not correspond to the telephone number associated with the registered purchasing location. In some embodiments, the methods may further include rejecting the prospective remote credit card transaction if the IP address does not correspond to the domain associated with the internet service provider associated with the registered purchasing location or if the telephone number of the telephone used to initiate the prospective remote credit card transaction does not correspond to the telephone number associated with the registered purchasing location.

The methods may further include selectively authorizing the prospective remote credit card transaction if the profile indicates that multiple wireless terminals are associated with the registered cardholder of the credit card for the prospective remote credit card transaction and the location of at least one of the multiple wireless terminals corresponds to the registered purchasing location of the registered cardholder, and selectively obtaining additional authentication information concerning the prospective remote credit card transaction prior to authorizing the prospective remote credit card transaction if none of the locations of the multiple wireless terminals corresponds to the registered purchasing location of the registered cardholder.

It will be understood that while various method embodiments of the invention have been described above, analogous server, system and computer program embodiments also may be provided according to other embodiments of the invention. Moreover, the various embodiments of the invention that are described herein may be combined in various combinations and subcombinations.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
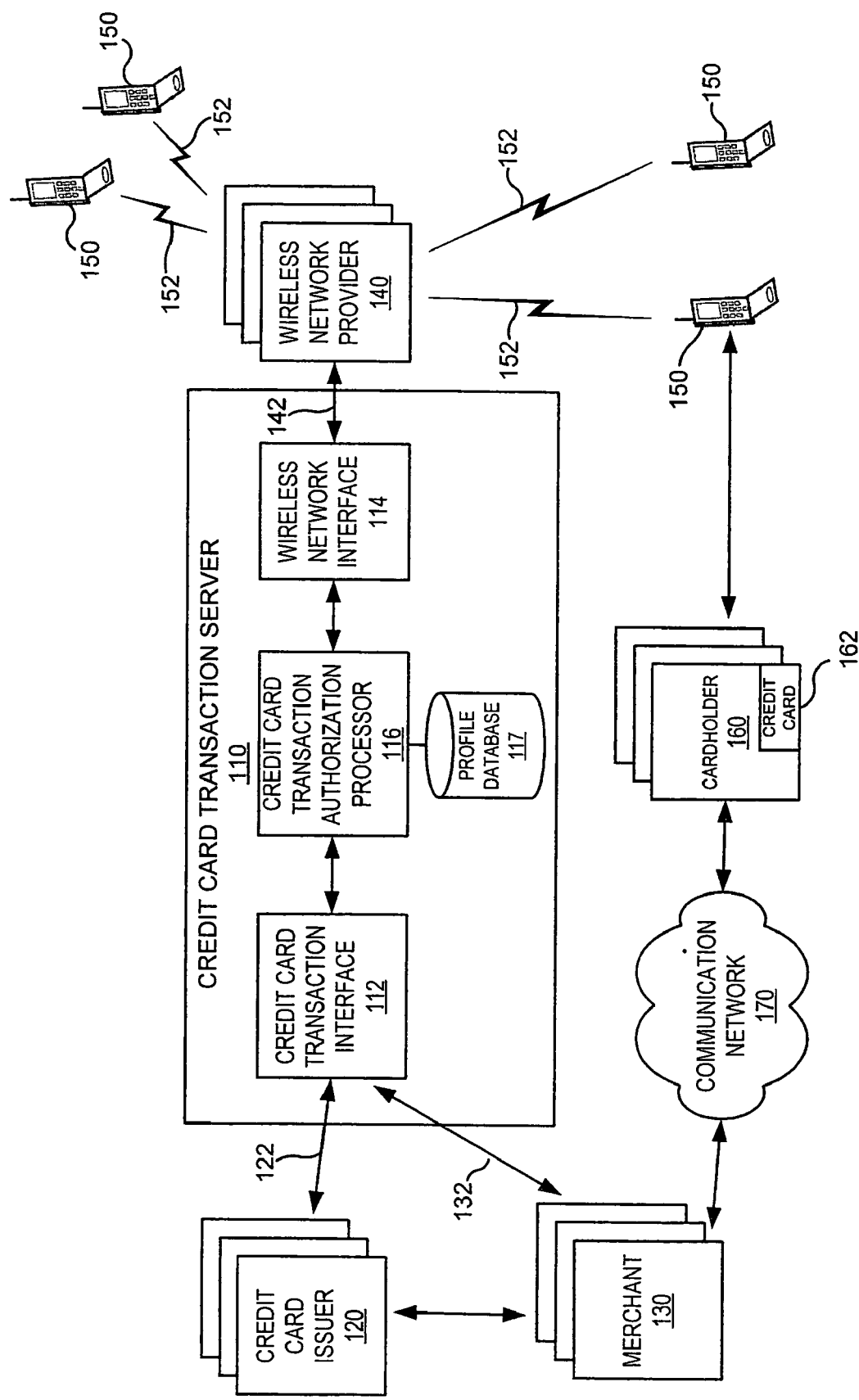
FIG. 1 is a block diagram of wireless terminal location based credit card authorization servers, systems, methods and/or computer program products-according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1 is a block diagram of credit card transaction servers, systems, methods and/or computer program products according to various embodiments of the present invention. Referring now to FIG. 1, a credit card transaction server 110 includes a credit card transaction interface 112, a wireless network interface 114 and a credit card authorization processor 116. The credit card transaction server 110 may be embodied as one or more enterprise, application, personal, pervasive and/or embedded computer systems that are connected via a wireless and/or wired, private and/or public network, including the Internet.

The credit card transaction interface 112 is configured to receive information about credit card transactions that are associated with at least one, and possibly more, credit card issuers 120. The information about credit card transactions may be obtained directly from the credit card issuer(s) 120 and/or from one or more merchants 130 that accept remote credit card payments, such as retailers that accept orders by telephone and/or the Internet. The information about the remote credit card transactions may be received from the credit card issuer(s) 120 over private and/or public wired and/or wireless communications links 122, and the information about credit card transactions may be received from the merchant(s) 130 over private and/or public wired and/or wireless communications links 132. By receiving information about credit card transactions that are associated with a plurality of credit card issuers, the credit card transaction server 110 can provide an authorization clearinghouse for credit card transactions for multiple credit card issuers 120 and/or merchant(s) 130, to thereby potentially help reduce credit card fraud. However, in other embodiments, the server 110 may service a single credit card issuer 120 and/or merchant 130.

Still continuing with the description of FIG. 1, the wireless network interface 114 is configured to obtain location information for a plurality of wireless terminals 150 that are serviced by one or more wireless network providers 140. The location information may be obtained in response to a specific inquiry related to a prospective credit card transaction and/or may be obtained periodically by the wireless network interface 114 polling the wireless network providers 140 and/or by the wireless network providers 140 periodically providing the location information to the wireless network interface 114. The wireless network providers 140 may communicate with the wireless network interface 114 over one or more private and/or public wired and/or wireless communications links 142. The wireless terminals 150 may communicate with the wireless network providers 140 over one or more wireless links 152 using conventional wireless protocols. As used herein, the term "wireless terminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver. By providing an interface to multiple wireless network providers 140, location information concerning multiple wireless terminals that are registered to a given cardholder may be obtained, which can be used to reduce credit card fraud as will be described below. However, in other embodiments, the server 110 may query a single wireless network provider 140.

Although the server 110 is illustrated in FIG. 1 as a standalone system that is separate from the credit card issuer(s) 120, the merchant(s) 130 and the wireless network provider (s) 140, it will be appreciated that the server 110 could be operated by and/or located at a credit card issuer 120, a merchant 130, a wireless network provider 140 and/or at some other location, such as a credit card authorization clearinghouse that provides credit card transaction authentication services for a plurality of credit card issuers and/or merchants.

Still referring to FIG. 1, a remote credit card transaction may be initiated by a cardholder 160 placing a credit card order with a merchant 130 via a communication network 170. For example, a cardholder 160 may initiate a remote credit card transaction with a merchant 130 by logging onto a website of the merchant 130 through a data communications network, such as the Internet and transmitting the credit card number of a credit card 162 owned by the cardholder 160 to the merchant 130. A cardholder 160 may also initiate a remote credit card transaction with a merchant 130 by telephoning the merchant 130 through a wired and/or wireless telephone network. Accordingly, the communication network 170 illustrated in FIG. 1 may include a data communication network such as the Internet, or a telephone network such as a public switched telephone network (PSTN) and/or a wireless telephone network. In either case, while the cardholder 160 may not be physically present at a retail store operated by the merchant 130, the merchant 130 may know certain information about the cardholder 160, such as the telephone number from which the cardholder 160 called the merchant 130 and/or a network address, such as an internet protocol IP address, of a computer terminal from which the credit card order was initiated.

Upon receipt of a credit card order from a cardholder 160, the merchant 130 may contact the credit card issuer 120 associated with the credit card number provided by the cardholder 160, or a proxy of the credit card issuer 120, such as a credit card authorization clearinghouse, in order to authorize the prospective remote credit card transaction. In some embodiments, the merchant 130 may contact the credit card transaction server 110 directly to obtain authorization of the prospective credit card transaction.

Still referring to FIG. 1, a credit card transaction authorization processor 116 in the credit card transaction server 110 communicates with the credit card transaction interface 112 and the wireless network interface 114. In some embodiments, the credit card transaction authorization processor 116 is responsive to receipt of information concerning a prospective remote credit card transaction with one of the plurality of credit card issuers 120 received from the credit card issuer 120 or from a merchant 130 via the credit card transaction interface 112 in a credit card transaction authorization request. In particular, upon receipt of the credit card transaction authorization request, the credit card transaction authorization processor 116 may instruct the wireless network interface 114 to obtain location information from one or more of the plurality of wireless network providers 140 for at least one wireless terminal 150 that is associated with a registered cardholder 160 of the credit card 162 for the prospective credit card transaction.

The information regarding the prospective credit card transaction may be received by the credit card transaction interface 112 of FIG. 1 from the credit card issuer 120 and/or from the merchant 130 that is associated with the transaction.

The information that is received can include a transaction amount, a credit card number, a cardholder name, a merchant identification number and/or other conventional information concerning the transaction. The information may also include, for example, a network address, such as an IP address, of a computer terminal from which the remote credit card transaction was initiated, and/or a telephone number of a telephone from which the remote credit card transaction was initiated.

In particular, upon receipt of credit card transaction authorization request, the credit card transaction authorization processor 116 may retrieve a profile from a local or remote profile database 117 that contains cardholder profile information associated with the credit card number provided in the request. The cardholder profile information may include, for example, one or more wireless terminal identifiers, such as telephone numbers associated with wireless terminals 150, the identities of one or more wireless network providers associated with the wireless terminals, an e-mail address associated with the cardholder, one or more registered purchasing locations associated with the credit card number, and/or one or more registered Internet service providers and/or telephone numbers associated with the registered purchasing locations.

Using profile information obtained from the profile database 117, the wireless network interface 114 can obtain location information for one or more wireless terminals 150 associated with the cardholder by polling the wireless network providers 140 and/or by searching pre-stored location information.

The credit card transaction authorization processor 116 is also configured to correlate a registered purchasing location identified in the profile information with the location(s) of the at least one wireless terminal 150, and to generate authorization information for the prospective credit card transaction based on the correlation of the registered purchasing location and the location of the at least one wireless terminal. Accordingly, if it is determined that a wireless terminal 150 associated with the cardholder/cardholder 160 is located sufficiently close to a registered purchasing location stored in the cardholder profile associated with the credit card number identified in the credit card transaction authorization request, there may be an enhanced likelihood that the proposed transaction is genuine, and that additional authentication may not be required. Many specific embodiments will be described in detail below.

Accordingly, in order to take advantage of the transaction authorization systems and/or methods according to embodiments of the invention, a cardholder may register certain information with the credit card transaction server 110. In particular, the cardholder 160 may register one or more credit cards 162 and one or more registered purchasing locations that are associated with the registered credit cards 162 of the cardholder 160. In addition, the cardholder 160 may register the identities of one or more wireless terminals 150 associated with the cardholder 160, and possibly the names of the wireless network providers 140 associated with the one or more wireless terminals 150. Furthermore, the cardholder may register the identities of one or more Internet service providers and/or telephone numbers associated with the registered purchasing locations. This information may be used as described below to provide enhanced security for remote credit card transactions.

The registered purchasing location may include a location at which the cardholder customarily initiates remote credit card transactions, such as the cardholder's home and/or office location. The registered purchasing location may be provided by the cardholder 160 as an address which may become converted by the credit card transaction server 110 into longitude/latitude information. Geographical information systems that are capable of converting addresses into longitude/latitude information, such as Google® Maps or MapQuest® are well known to those having skill in the art and need not be described further herein.

Many techniques may be used by a wireless network provider 140 to determine a location of a wireless terminal 150. For example, the wireless terminal 150 may include a GPS or other location tracking circuitry therein. Alternatively, triangulation techniques based on the wireless network cells to which a given wireless terminal 150 is communicating may be used. Other techniques also may be used.

Accordingly, a credit card transaction server 110 according to some embodiments of the present invention can service credit card transactions from multiple merchants 130 and/or multiple credit card issuers 120, and can correlate a registered purchasing location of a cardholder 160 of a credit card 162 with the location of one or more wireless terminals 150 that are registered to the cardholder 160 for the prospective credit card transaction. A location based credit card transaction authorization clearinghouse thereby may be provided that can process requests from multiple credit card issuers 120 and multiple merchants 130, and can obtain location information from multiple wireless network providers 140. Moreover, added levels of fraud prevention may be provided by obtaining location information for multiple wireless terminals 150 of a given wireless network provider 140 or multiple wireless network providers 140 that are registered in a given cardholder profile. Accordingly, increased levels of fraud prevention may be provided.

Figure 2:
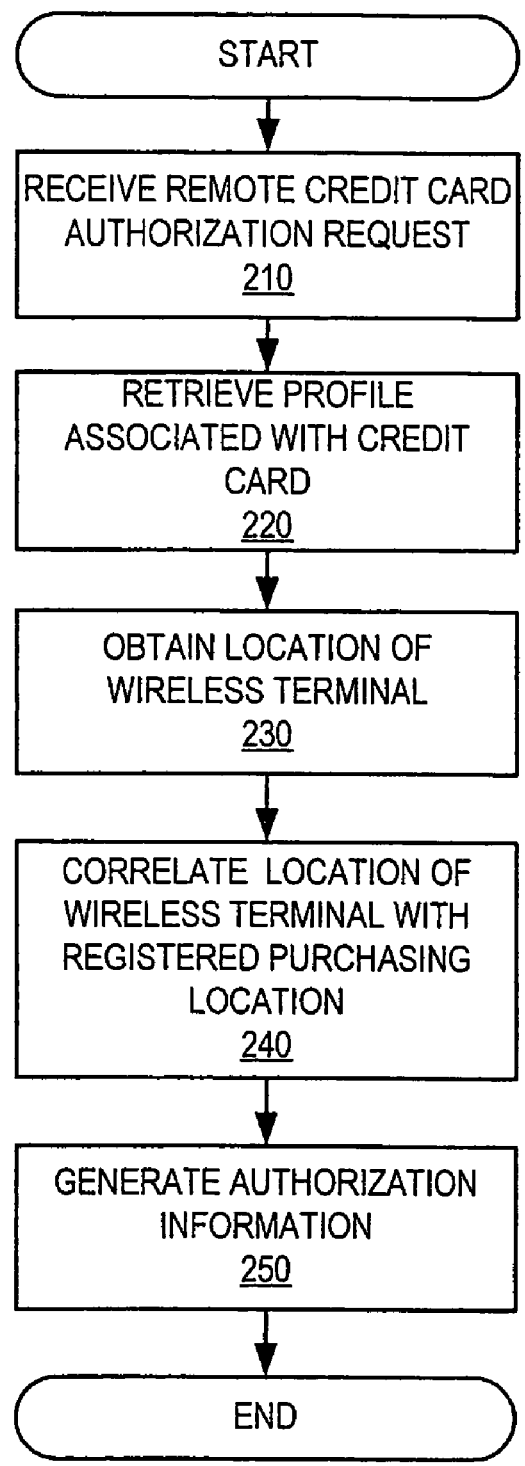
FIGS. 2-6 are flowcharts of operations that may be performed for credit card transaction authorization according to various embodiments of the present invention.

FIG. 2 is a flowchart of operations that may be performed by a credit card transaction authorization processor, such as the credit card transaction authorization processor 116 of FIG. 1, according to some embodiments of the present invention. Referring now to FIG. 2, at Block 210, a credit card transaction authorization request containing information about a prospective credit card transaction for which authorization is requested is received. This information may be received by the credit card transaction interface 112 of FIG. 1 from the credit card issuer 120 and/or the merchant 130 that is associated with the prospective credit card transaction. The information that is received can include a transaction amount, a credit card number, a cardholder name, a merchant identification number and/or other conventional information concerning the transaction. The information may also include a network address, such as an IP address, of a computer terminal from which the remote credit card transaction was initiated, and/or a telephone number of a telephone from which the remote credit card transaction was initiated.

Referring to Block 220, in response to receiving information about the prospective credit card transaction, the credit card transaction authorization processor 116 may retrieve a cardholder profile from the profile database 117 that corresponds to the credit card number identified in the request. The cardholder profile information may include, for example, one or more wireless terminal identifiers, such as telephone numbers associated with wireless terminals 150 that are associated with the cardholder, the identities of one or more wireless network providers associated with the wireless terminals, an e-mail address associated with the cardholder, one or more registered purchasing locations associated with the credit card number, and/or one or more registered Internet service providers and/or telephone numbers associated with the registered purchasing locations.

Referring now to Block 230, in response to receiving the information about the prospective transaction, the credit card transaction authorization processor 116 may direct the wireless network interface 114 to obtain location information for one or more wireless terminals 150 that were identified in the cardholder profile associated with the credit card number identified in the transaction authorization request. In order to obtain the location information, the wireless network providers 140 may be polled. The polling may take place via communication between the wireless network interface 114 and the wireless network provider 140 over links 142. It will also be understood by those having skill in the art that, in other embodiments, polling need not take place, but, rather, information concerning locations of wireless terminals 150 may be provided periodically by the wireless network providers 140 to the wireless network interface 114, and pre-stored by the wireless network interface 114 and/or the credit card transaction authorization processor 116.

It also will be understood that embodiments of the invention can allow multiple wireless network providers 140 to be polled or otherwise to provide location information. By allowing multiple wireless network providers 140 to provide location information, enhanced security may be provided. For example, when multiple wireless terminals 150 are associated with a given cardholder 160, the location of all of the wireless terminals 150 may be correlated with the registered purchasing location(s) identified in the cardholder profile for the prospective credit card transaction. Moreover, when wireless terminals 150 for a given cardholder 160 are provided by multiple wireless network providers 140, enhanced security authorization may be obtained to reduce the likelihood that a wireless terminal was registered with another network provider by a thief in order to foil or spoof the location based authorization.

Continuing with the description of FIG. 2, at Block 240, when an identification of locations of the wireless terminals 150 has been obtained from all of the wireless network providers 140, then at Block 240 the credit card transaction authorization processor 116 correlates the registered purchasing location(s) stored in the cardholder profile and the location(s) of at least one wireless terminal 150 identified in the cardholder profile to determine if the location of a least one wireless terminal 150 corresponds to a registered purchasing location stored in the cardholder profile. Many different embodiments of correlating the locations will be described in detail below. Finally, at Block 250, authorization information for the prospective credit card transaction is generated based on the correlation of the registered purchasing location with the location of the at least one wireless terminal 150. Many different embodiments of generating authorization information will be described below.

According to some embodiments of the invention, enhanced authentication of prospective credit card transactions may be performed if the location of a wireless terminal 150 associated with the cardholder 160 does not correspond to a registered purchasing location associated with the credit card being used in the prospective credit card transaction. The location of a wireless terminal 150 may correspond to a registered purchasing location if it is determined that the location of the wireless terminal 150 is sufficiently close to a registered purchasing location such that it is deemed to be at the registered purchasing location. The definition of "sufficiently close" may always be the same or may vary depending upon the application. For example, it may required that the wireless terminal 150 is within 10 feet, or a minimum resolution distance of the registered purchasing location, to ensure that the wireless terminal 150 is actually carried on the person of the cardholder 160. However, this distance may be relaxed by a given credit card issuer 120 or merchant 130, and/or may be relaxed based on a preference in the cardholder profile.

Figure 3:
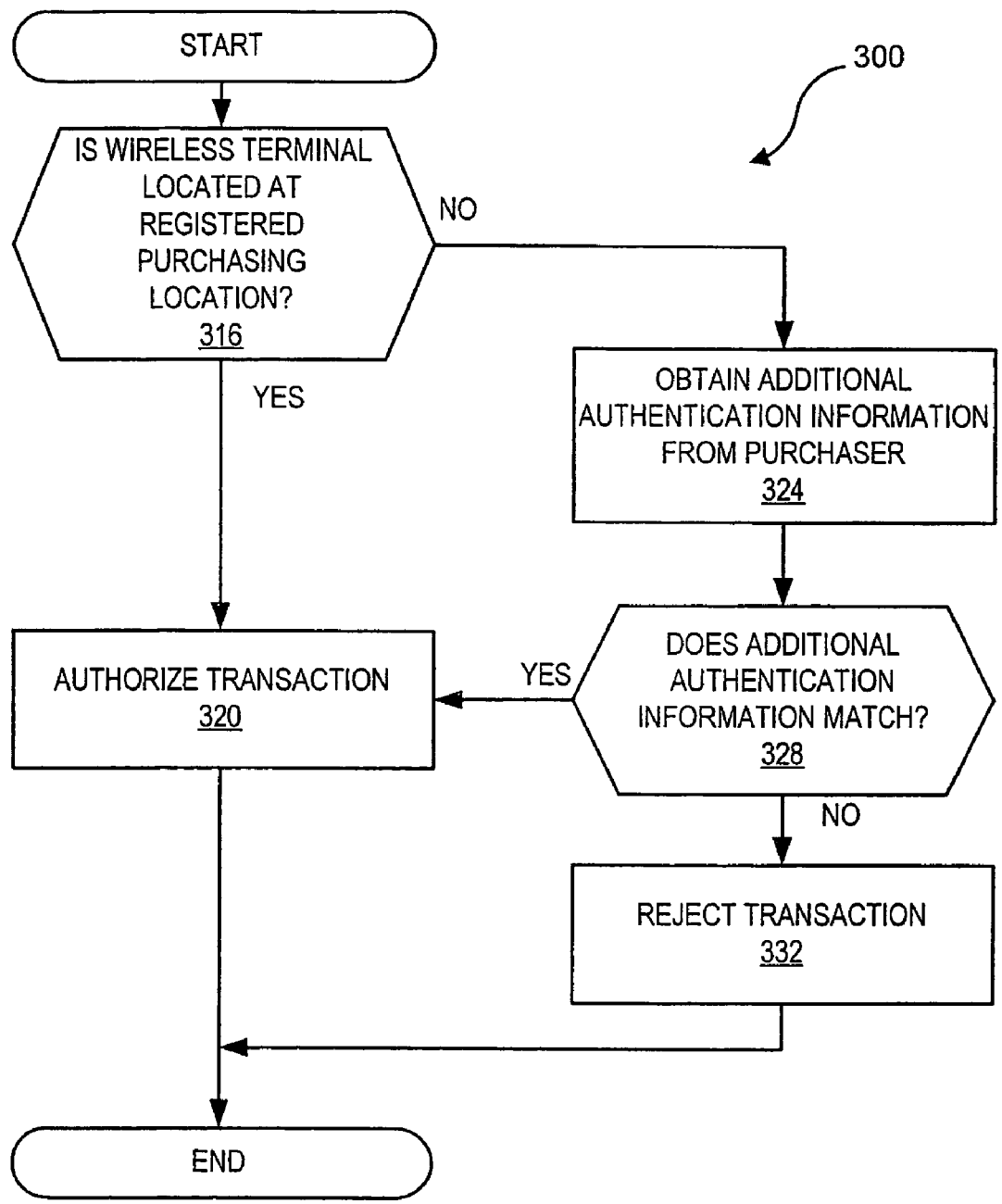

FIG. 3 illustrates certain operations 300 associated with correlating the location of a wireless terminal 150 with a registered purchasing location and, in response to the correlation, generating authorization information for the prospective remote credit card transaction. As shown in FIG. 3, it is first determined whether or not a wireless terminal 150 identified in the cardholder profile is located at a registered purchasing location (Block 316). As noted above, the wireless terminal 150 may be determined to be at the registered purchasing location if the wireless terminal 150 is located no more than a threshold distance away from the registered purchasing location. If it is determined that the wireless terminal 150 is located at a registered purchasing location, then the transaction may be authorized (Block 320). However, if it is determined that the wireless terminal 150 is not located at a registered purchasing location, then additional authentication information may be obtained from the purchaser in order to confirm that the proposed transaction is authorized (Block 324). In some embodiments, if multiple wireless terminals 150 are identified in the cardholder profile, additional authentication information may be obtained if none of the wireless terminals 150 is located at a registered purchasing location. In other embodiments, if multiple wireless terminals 150 are identified in the cardholder profile, additional authentication information may be obtained if any one of the wireless terminals 150 is not located at a registered purchasing location.

Additional authentication may be provided in a number of ways. For example, the credit card transaction authorization processor 116 may send a message to the wireless terminal 150 via the wireless communication system of the wireless network provider 140 providing the cardholder 160 with an authorization code. The cardholder 160 may then provide the authorization code to the merchant 130, for example over the phone or via the Internet. The message may state, for example, "Please enter the following authorization code XXX", and the authorization code may also be simultaneously transmitted to the merchant 130. Alternatively, or in addition, a message may be transmitted to a computer terminal that was used to initiate the credit card transaction, and/or to an email address associated with the cardholder 160 that is stored in the cardholder profile, instructing the cardholder 160 to perform additional acts to confirm authorization of the transaction, such as logging on to a website specified in the message.

In some embodiments, the credit card transaction authorization processor 116 may send a message to the merchant 130 through the credit card transaction interface 112, such as a password that may be stored in the cardholder profile. The merchant 130 may then request the cardholder to provide the authentication password.

The additional authentication information is checked to see if it matches the expected information (Block 328). If the additional authentication information provided by the cardholder 160 matches the expected information, for example if the cardholder 160 provides the correct password or code in response to a request by the merchant 130, then the transaction may be authorized (Block 320). Otherwise, the prospective credit card transaction may be rejected (Block 332).

Figure 4A:
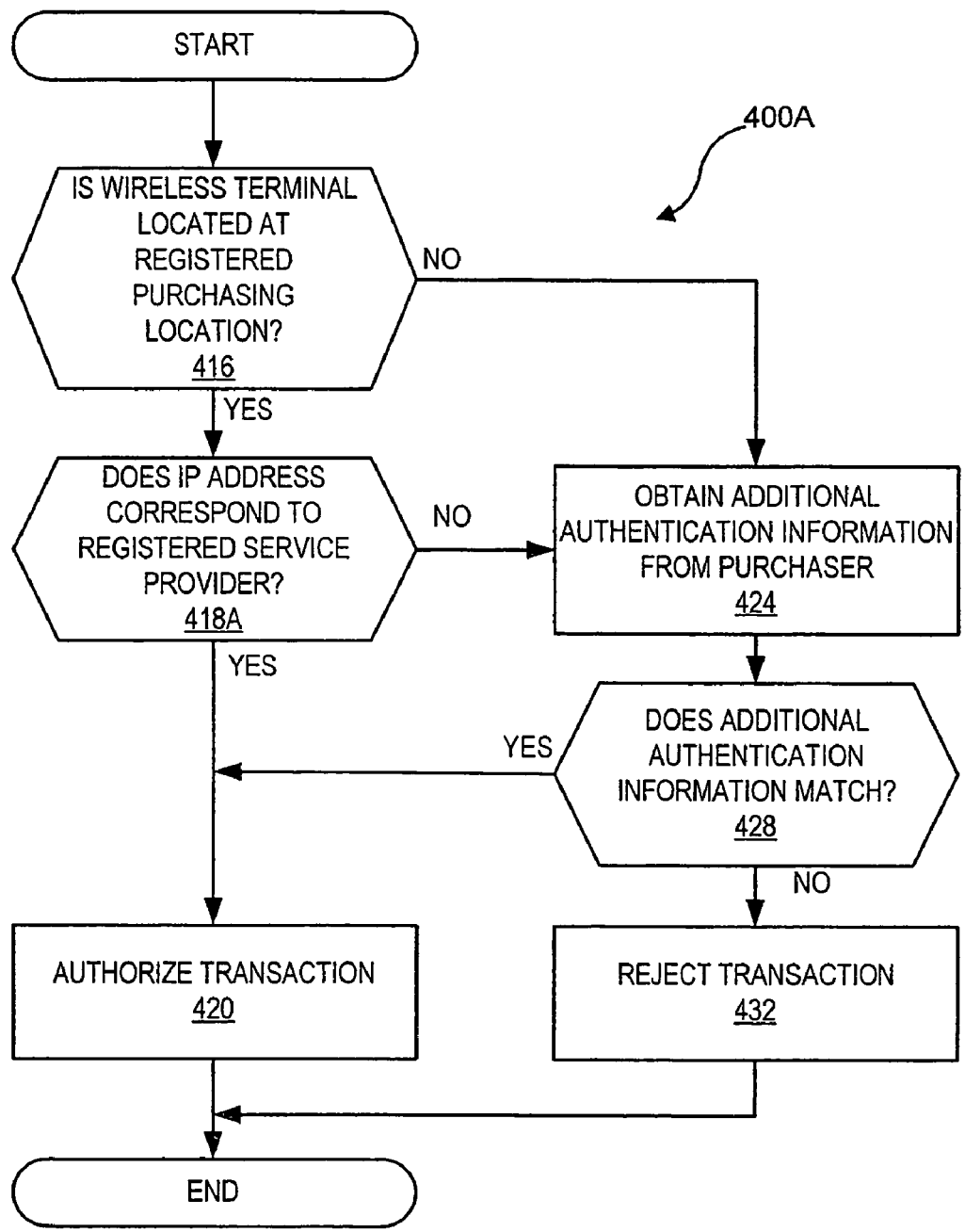

Operations 400A according to further embodiments of the invention are illustrated in FIG. 4A. In the operations 400A, it is assumed that the prospective credit card transaction is an Internet transaction that was initiated at a computer terminal, for example by logging on to a website of a merchant 130. As shown therein, is first determined if a wireless terminal 150 associated with the cardholder 160 is located at a registered purchasing location (Block 416). If the wireless terminal 150 is determined to be located at a registered purchasing location, the credit card transaction authorization processor 116 determines if a network address, such as the IP address, of a computer terminal from which the proposed credit card transaction was initiated (which was provided to the credit card transaction interface 112 along with the transaction authorization request), corresponds to the internet service provider associated with the registered purchasing location at which the wireless terminal 150 is located (Block 418A). An IP address can be correlated with an Internet service provider by, for example, determining if the IP address falls within a domain, or set of IP addresses, administered by the service provider. As used herein, the term "domain" can include the conventionally defined Internet domain as well as any means of explicitly or implicitly specifying or indicating or suggesting one or more addresses and/or one or more sets of addresses, which for instance may include sub-domains, networks, sub-networks, address lists, address spaces, address sequences, etc.

If, in Block 418A, it is determined that the IP address of the computer terminal from which the prospective credit card transaction was initiated does correspond to the Internet service provider associated with the registered purchasing location, then the transaction may be authorized (Block 420). However, if it is determined that the IP address does not correspond to the Internet service provider associated with the registered purchasing location, then additional authentication information may be obtained, as described above (Block 424). The additional authentication information may be checked (Block 428) and the transaction may be authorized (Block 420) or rejected (Block 432) based on the additional authentication information.

Figure 4B:
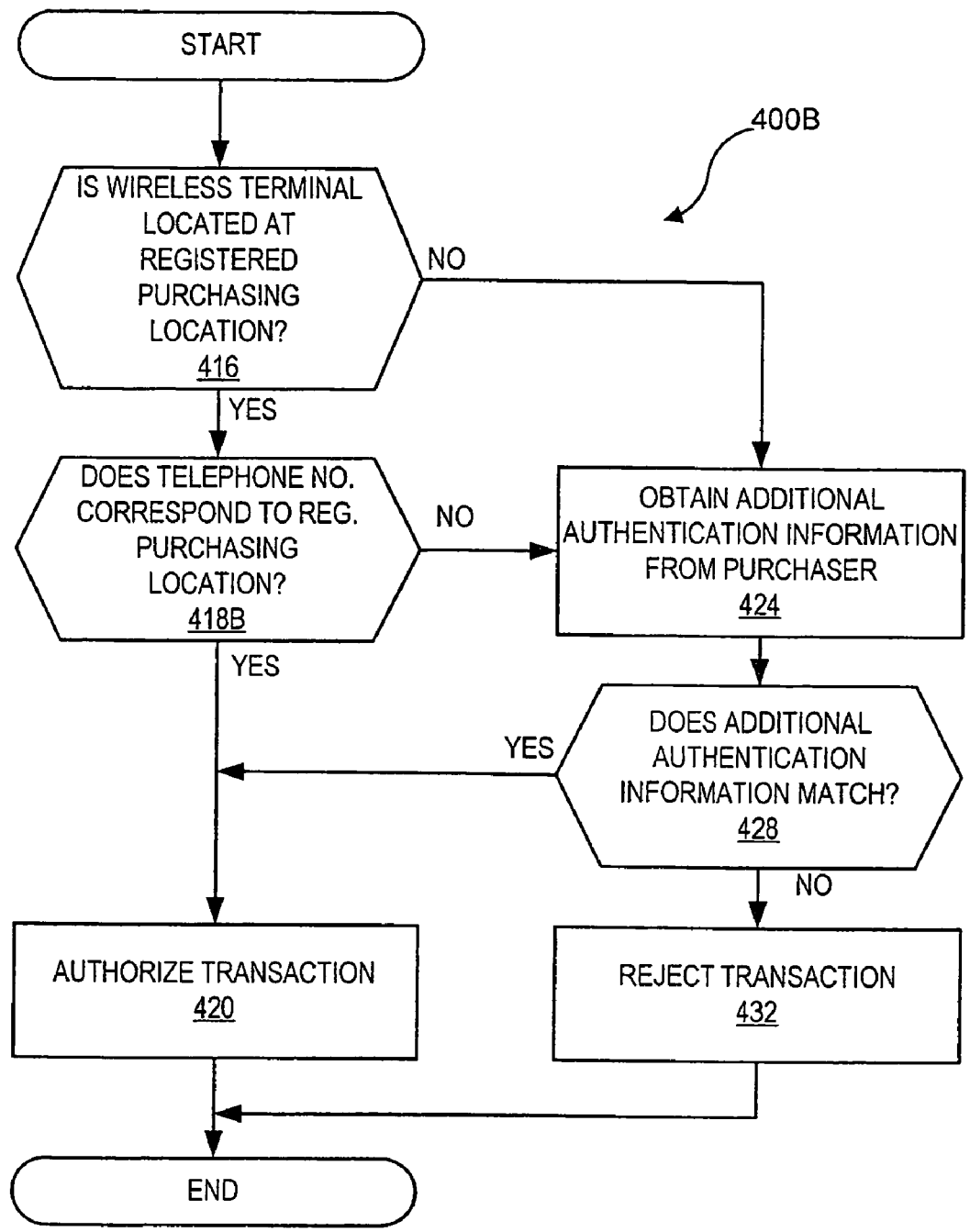

Operations 400B according to further embodiments of the invention are illustrated in FIG. 4B. In the operations 400B, it is assumed that the prospective credit card transaction is telephone transaction that was initiated, for example by a telephone call to a merchant 130. As shown therein, is first determined if a wireless terminal 150 associated with the cardholder 160 is located at a registered purchasing location (Block 416). If the wireless terminal is determined to be located at a registered purchasing location, the credit card transaction authorization processor 116 determines if the telephone number of the telephone from which the proposed credit card transaction was initiated (which was provided to the credit card transaction interface 112 along with the transaction authorization request), corresponds to the registered purchasing location at which the wireless terminal 150 is located (Block 418B).

If, in Block 418B, it is determined that the telephone number of the telephone from which the prospective credit card transaction was initiated does correspond to the registered purchasing location, then the transaction may be authorized (Block 420). However, if it is determined that the telephone number does not correspond to the registered purchasing location, then additional authentication information may be obtained, as described above (Block 424).

The embodiments illustrated in FIGS. 4A and 4B may arise from a recognition that the cardholder 160 may be at a registered purchasing location (such as the cardholder's home or work location) while a thief is attempting to use the cardholder's credit card to make a remote purchase from some other location. However, if it is determined, in the case of an Internet purchase, that the IP address of the computer terminal from which the prospective credit card transaction is being initiated does not correspond to an Internet service provider associated with the registered purchasing location, or, in the case of a telephone purchase, that the telephone number of the telephone used to initiate the transaction does not correspond to the registered purchasing location at which the wireless terminal 150 is located, then it may be desirable to obtain additional authentication information before authorizing the transaction. As in the embodiments described above, if the additional authentication information does not match, the transaction may be rejected (Block 432).

Figure 5:
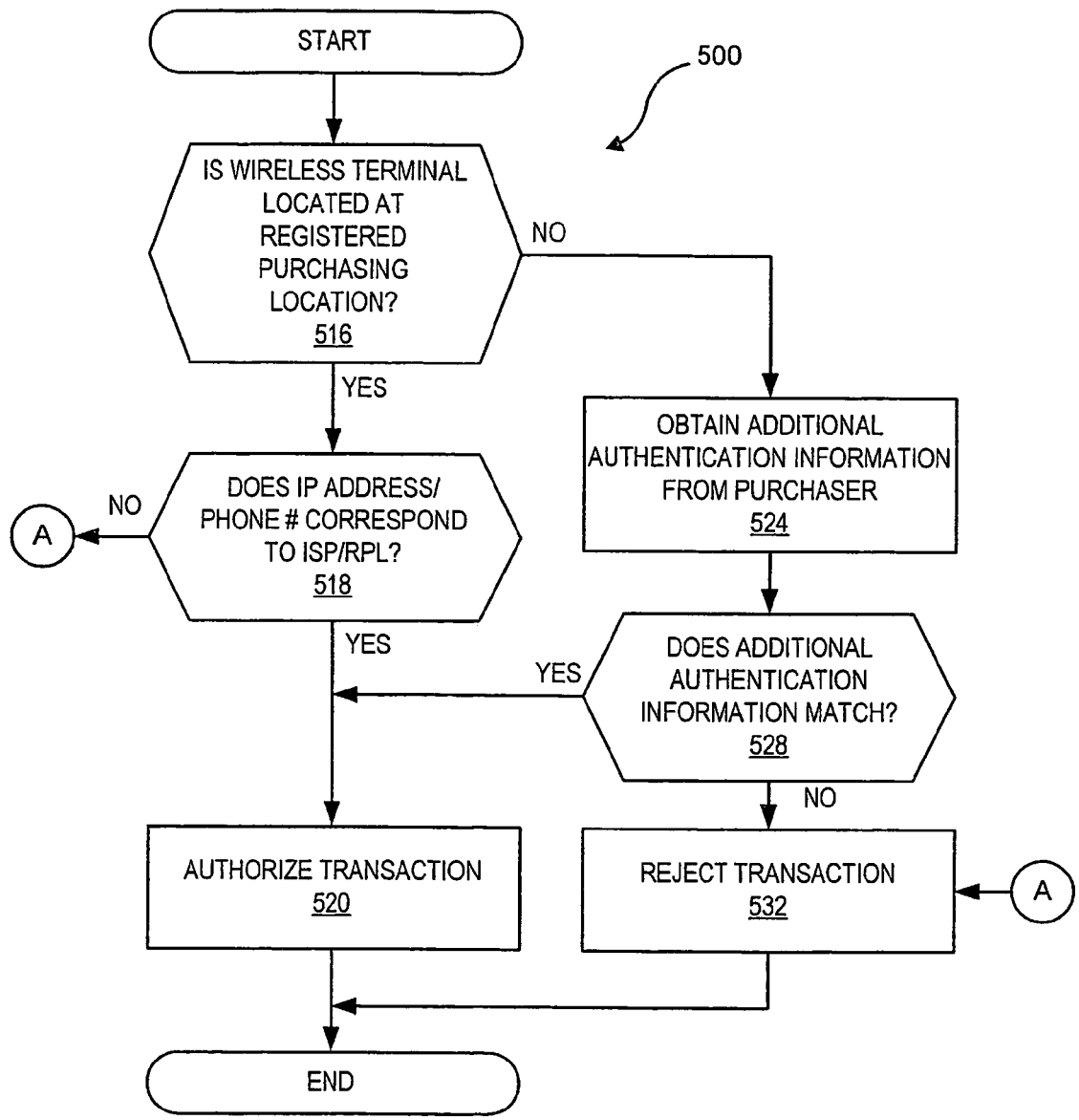

Operations 500 according to further embodiments of the invention are illustrated in FIG. 5. The operations 500 are substantially similar to the operations 400A and 400B described in connection with FIGS. 4A and 4B, respectively, except that if it is determined that the wireless terminal 150 is located at a registered purchasing location, but that the IP address of the computer terminal from which the credit card transaction was initiated is not associated with the service provider associated with the registered purchasing location (or that the telephone number of the telephone from which the credit card transaction was initiated is not associated with the registered purchasing location), then it may be desirable to immediately reject the transaction (as indicated by the on-page reference A in FIG. 5), since there may be a relatively high likelihood that the transaction is fraudulent.

Figure 6:
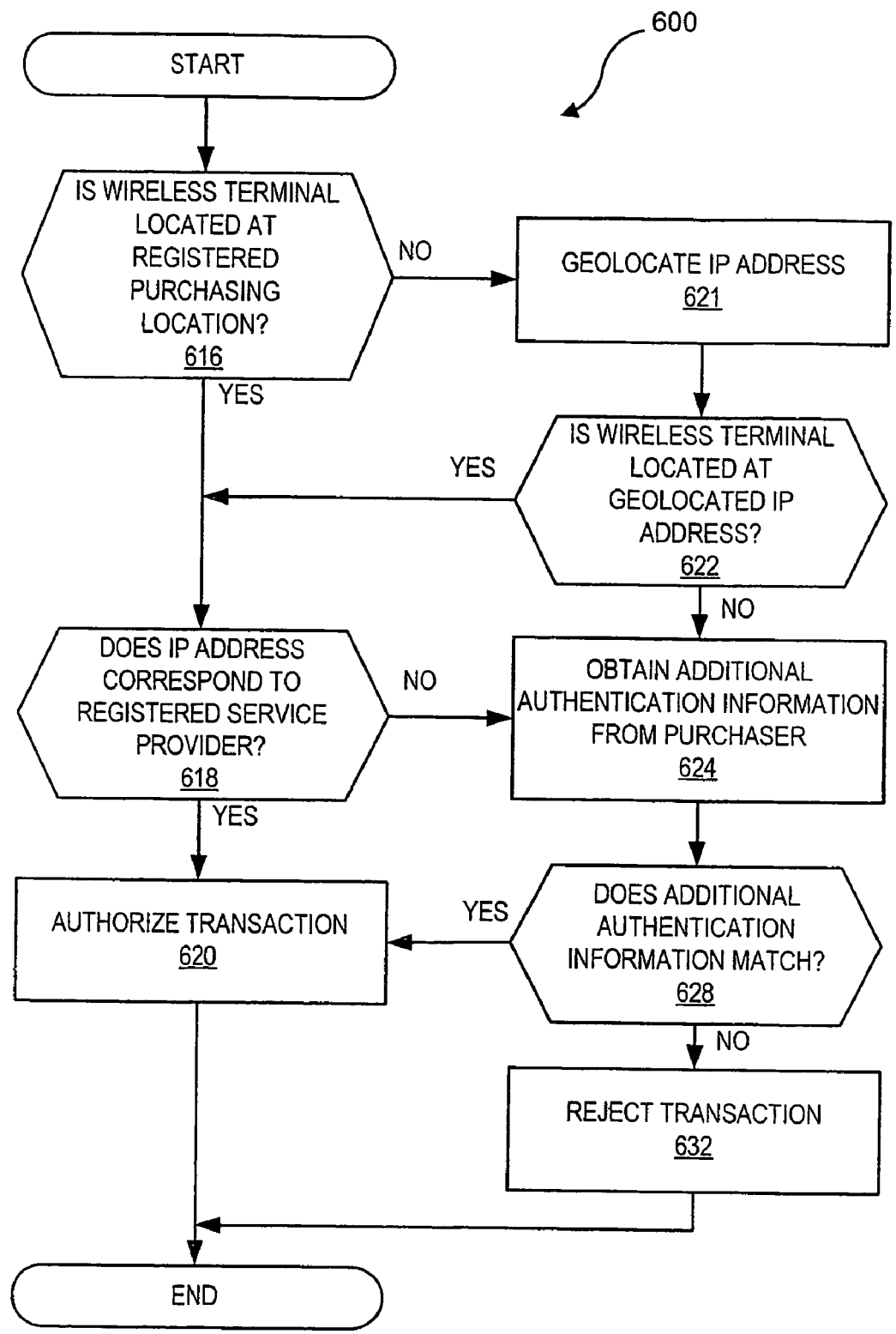

Operations 600 according to still further embodiments of the invention are illustrated in FIG. 6. As shown therein, if it is determined, at Block 616, that a wireless terminal associated with the cardholder 160 is not located at a registered purchasing location associated with the cardholder 160, the credit card transaction authorization processor 116 may perform a geolocation of the IP address of the computer terminal from which the prospective credit card transaction was initiated. Geolocation of an IP address involves determining a geographic location of a computer terminal associated with an IP address. IP address geolocation is well known in the art and is provided by a number of service providers including, for example, Quova's Geopoint service.

An IP address may typically be geolocated to within at least a city, and possibly within a particular subdivision of a city. While IP address geolocation may provide a relatively low degree of accuracy compared with, for example, GPS and/or other wireless location methods, it may be sufficient for purposes of determining if a wireless terminal associated with the cardholder 160 is located near the computer terminal from which the prospective credit card transaction was initiated, since it may be less likely that a thief is using the card from a location near the legitimate cardholder. Accordingly, if it is determined that the wireless terminal 150 is located at or near the geolocation of the IP address (Block 622), then it may be further determined if the IP address corresponds to a service provider associated with the cardholder (Block 618) and if so, the transaction may be authorized (Block 620). Otherwise, additional authentication information may be obtained (Block 624) and used to determine whether or not the transaction should be authorized, as described above.

In some embodiments, an additional correlation may be made of cardholder credit card history. For example, the history of past credit card transactions for the credit card that took place prior to the prospective credit card transaction may be included in the correlation. Accordingly, credit card profiling that is conventionally used to determine authenticity of a transaction based on past buying habits of a cardholder and/or other concurrent transactions by the cardholder may be correlated with the location of the credit card transaction terminal and the location(s) of the wireless terminal(s) in generating the authorization information.

Some embodiments of the invention may arise from recognition that it may be desirable to provide a central credit card transaction server that is capable of communicating with multiple credit issuers, multiple merchants and/or multiple wireless network providers, to provide a location based credit card transaction authorization clearinghouse. However, other embodiments of the present invention may allow a given wireless network provider to provide location information for wireless terminals in its own system to a plurality of credit card issuers and/or merchants. Moreover, in other embodiments, the credit card transaction server may be operated by a given wireless network provider and the credit card transaction server may be configured to identify wireless phones of other wireless network providers that are registered to the cardholder of a card used for a prospective credit card transaction. There may be privacy issues and/or regulatory issues that may impact the solicitation or transmission of customer identification information, but these issues may be overcome using appropriate encryption and/or pseudonyms. For example, in some embodiments, a pseudonym may be used to hash the personal information of a user of another wireless network provider.

Moreover, any of the embodiments that were described above may be conditioned on the cost of the item being purchased by the credit card transaction, by a metric of prior or concurrent credit card transactions and/or some other indications of a large potential fraud. In other embodiments, however, these factors may need not be considered, because it may be regarded as important to detect any fraud, big or small.

Furthermore, it will be appreciated that while embodiments of the invention have been described in connection with credit cards, no physical "card" is necessary for the implementation of the invention. Accordingly, embodiments of the invention may be used to reduce fraud in connection with the remote use of any financial account that is identified by a unique account number, including, for example, debit accounts, home equity accounts, revolving credit accounts, retail credit accounts, and the like, in which case references herein to the "cardholder" refer to the owner of the account in question.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A credit card transaction server, comprising:
a credit card transaction interface that is configured to receive information about a credit card transaction that is associated with a credit card;
a wireless network interface that is configured to obtain location information for a plurality of wireless terminals that are associated with a wireless network provider; and
a credit card transaction authorization processor that is configured:
to store a registered purchasing location for a registered cardholder of a credit card in advance of a purchase being made with the credit card;
to receive information from the credit card transaction interface concerning a prospective remote credit card transaction with the credit card,
to instruct the wireless network interface to obtain location information from the wireless network provider for a wireless terminal that is associated with the registered cardholder of the credit card,
to correlate a location of the wireless terminal with the registered purchasing location associated with the registered cardholder, and
to generate authorization information for the prospective remote credit card transaction in response to a result of the correlation of the location of the wireless terminal and the registered purchasing location;
wherein the information concerning the prospective remote credit card transaction comprises a credit card number associated with the credit card and an IP address associated with a computer terminal from which the prospective remote credit card transaction was initiated,
wherein the credit card transaction authorization processor is further configured:
to retrieve a profile associated with the credit card number from a profile database in response to receiving the information concerning the prospective remote credit card transaction, the profile including a wireless terminal identification number associated with the wireless terminal and an identification of the registered purchasing location;
to obtain a geographic location associated with the IP address in response to the location of the wireless terminal not corresponding to the registered purchasing location;
to compare the geographic location associated with the IP address with the location of the wireless terminal; and
to obtain additional authentication information concerning the prospective remote credit card transaction in response to the location of the wireless terminal not corresponding to the geographic location associated with the IP address.

2. A server according to claim 1, wherein the credit card transaction authorization processor is further configured to obtain additional authentication information concerning the prospective remote credit card transaction in response to the location of the wireless terminal not corresponding to the registered purchasing location.

3. A server according to claim 1, wherein the profile associated with the credit card number comprises a wireless terminal identification number associated with the wireless terminal, an identification of the registered purchasing location, and an identification of an internet service provider associated with the registered cardholder and with the registered purchasing location;
wherein the credit card transaction authorization processor is further configured to compare the IP address associated with the computer terminal from which the prospective credit card transaction was initiated with a domain associated with the internet service provider associated with the registered purchasing location.

4. A server according to claim 3, wherein the credit card transaction authorization processor is further configured to obtain additional authentication information concerning the prospective remote credit card transaction in response to the IP address not corresponding to the domain associated with the internet service provider associated with the registered purchasing location.

5. A server according to claim 3, wherein the credit card transaction authorization processor is further configured to reject the prospective credit card transaction in response to the IP address not corresponding to the domain associated with the internet service provider associated with the registered purchasing location.

6. A server according to claim 1, wherein the credit card transaction authorization processor is configured to selectively authorize the prospective credit card transaction in response to the profile indicating that multiple wireless terminals are associated with the registered cardholder of the credit card for the prospective credit card transaction and the location of at least one of the multiple wireless terminals corresponding to the registered purchasing location of the registered cardholder, and to selectively obtain additional authentication information from the registered cardholder prior to authorizing the prospective credit card transaction in response to none of the locations of the multiple wireless terminals corresponding to the registered purchasing location of the registered cardholder.

7. A credit card transaction authorization method, comprising:
   storing a registered purchasing location for a registered cardholder of a credit card in advance of a purchase being made with the credit card;
   receiving information concerning a prospective remote credit card transaction with the credit card,
   obtaining location information from a wireless network provider for a wireless terminal that is associated with the registered cardholder of the credit card,
   correlating a location of the wireless terminal with a registered purchasing location associated with the registered cardholder, and
   generating authorization information for the prospective credit card transaction in response to a result of the correlation of the location of the wireless terminal and the registered purchasing location;
   wherein the information concerning the prospective remote credit card transaction comprises a credit card number associated with the credit card and an IP address associated with a computer terminal from which the prospective remote credit card transaction was initiated, the method further comprising:
   retrieving a profile associated with the credit card number from a profile database in response to receiving the information concerning the prospective remote credit card transaction, the profile including a wireless terminal identification number associated with the wireless terminal, and an identification of the registered purchasing location;
   obtaining a geographic location associated with the IP address in response to the location of the wireless terminal not corresponding to the registered purchasing location;
   comparing the geographic location associated with the IP address with the location of the wireless terminal; and
   obtaining additional authentication information concerning the prospective remote credit card transaction in response to the location of the wireless terminal not corresponding to the geographic location associated with the IP address.

8. A method according to claim 7, further comprising:
   obtaining additional authentication information concerning the prospective remote credit card transaction in response to the location of the wireless terminal not corresponding to the registered purchasing location.

9. A method according to claim 8, wherein obtaining additional authentication information for the prospective credit card transaction comprises transmitting an email message to an email address associated with the registered cardholder and receiving a response from the registered cardholder in response to the email message.

10. A method according to claim 8, wherein obtaining additional authentication information for the prospective credit card transaction comprises transmitting a request message to the wireless terminal that is associated with the registered cardholder of the credit card for the prospective credit card transaction, and receiving a response message via the wireless network interface in response to the request message, wherein transmitting the request message comprises transmitting the request message via a wireless communication network associated with the wireless terminal and wherein receiving the response message comprises receiving the response message via the wireless communication network and/or via the internet.

11. A method according to claim 8, wherein obtaining additional authentication information for the prospective remote credit card transaction comprises receiving additional authentication information via a credit card transaction interface.

12. A method according to claim 7, further comprising:
   selectively authorizing the prospective remote credit card transaction in response to the profile indicating that multiple wireless terminals are associated with the registered cardholder of the credit card for the prospective remote credit card transaction and the location of at least one of the multiple wireless terminals corresponds to the registered purchasing location of the registered cardholder, and selectively obtaining additional authentication information concerning the prospective remote credit card transaction prior to authorizing the prospective remote credit card transaction in response to none of the locations of the multiple wireless terminals corresponding to the registered purchasing location of the registered cardholder.

13. A computer program product for credit card transaction authorization, the computer program product comprising:
   a computer readable storage medium having computer readable program code embodied in the medium, the computer readable program code comprising:
   computer readable program code configured to store a registered purchasing location for a registered cardholder of a credit card in advance of a purchase being made with the credit card;
   computer readable program code configured to receive information concerning a prospective remote credit card transaction with the credit card,
   computer readable program code configured to obtain location information from a wireless network provider for a wireless terminal that is associated with the registered cardholder of the credit card for the prospective credit card transaction,
   computer readable program code configured to correlate a location of the wireless terminal with a registered purchasing location associated with the registered cardholder, and
   computer readable program code configured to generate authorization information for the prospective remote credit card transaction in response to a result of the correlation of the location of the wireless terminal and the registered purchasing location;
   wherein the information concerning the prospective remote credit card transaction comprises a credit card number associated with the credit card and an IP address associated with a computer terminal from which the prospective remote credit card transaction was initiated, the computer program product further comprising:
   computer readable program code configured to retrieve a profile associated with the credit card number from a profile database in response to receiving the information concerning the prospective remote credit card transaction, the profile including a wireless terminal identification number associated with the wireless terminal, and an identification of the registered purchasing location;

computer readable program code configured to obtain a geographic location associated with the IP address in response to the location of the wireless terminal not corresponding to the registered purchasing location;

computer readable program code configured to compare the geographic location associated with the IP address with the location of the wireless terminal; and computer readable program code configured to obtain additional authentication information concerning the prospective remote credit card transaction in response to the location of the wireless terminal not corresponding to the geographic location associated with the IP address.

14. A computer program product according to claim 13, further comprising:

computer readable program code configured to selectively authorize the prospective remote credit card transaction in response to the profile indicating that multiple wireless terminals are associated with the registered cardholder of the credit card for the prospective remote credit card transaction and the location of at least one of the multiple wireless terminals corresponds to the registered purchasing location of the registered cardholder, and to selectively obtain additional authentication information concerning the prospective remote credit card transaction prior to authorizing the prospective remote credit card transaction in response to none of the locations of the multiple wireless terminals corresponding to the registered purchasing location of the registered cardholder.

15. A method according to claim 7, wherein the information concerning the prospective remote credit card transaction comprises a credit card number associated with the credit card and an IP address associated with a computer terminal from which the prospective remote credit card transaction was initiated, the method further comprising:

retrieving a profile associated with the credit card number from a profile database in response to receiving the information concerning the prospective remote credit card transaction, wherein the profile associated with the credit card number comprises a wireless terminal identification number associated with the wireless terminal, an identification of the registered purchasing location, and an identification of an internet service provider; and the method further comprising comparing the IP address associated with the computer terminal from which the prospective remote credit card transaction was initiated with a domain associated with the internet service provider associated with the registered purchasing location.

16. A method according to claim 15, further comprising obtaining additional authentication information concerning the prospective remote credit card transaction in response to the IP address not corresponding to the domain associated with the internet service provider associated with the registered purchasing location.

17. A method according to claim 15, further comprising rejecting the prospective remote credit card transaction in response to the IP address not corresponding to the domain associated with the internet service provider associated with the registered purchasing location.

18. A method according to claim 7, wherein the prospective remote credit card transaction is made with a merchant, wherein generating authorization information comprises generating authorization information independent of whether the location of the wireless terminal corresponds to a location associated with the merchant.

* * * * *